Patented Nov. 17, 1942

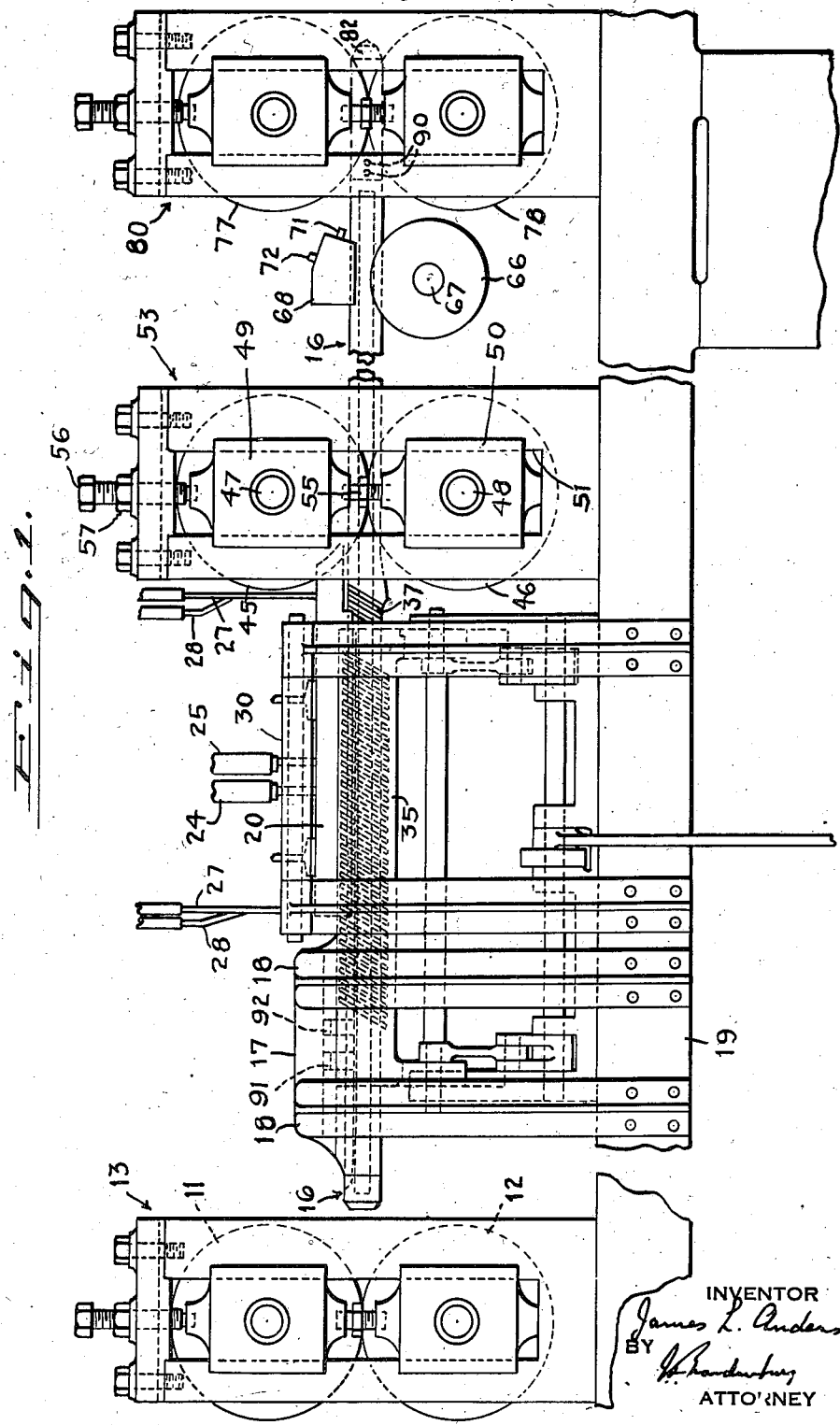

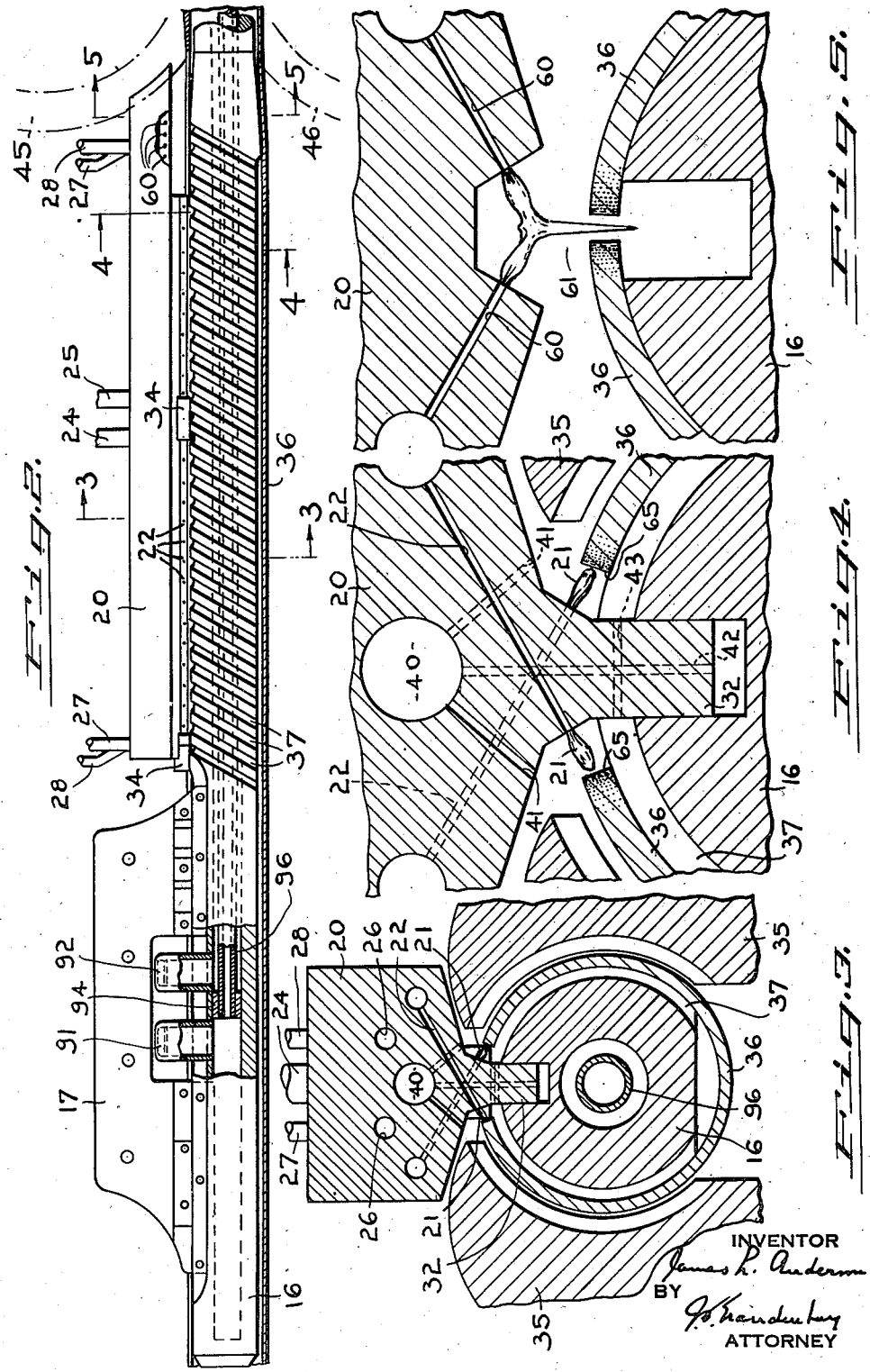

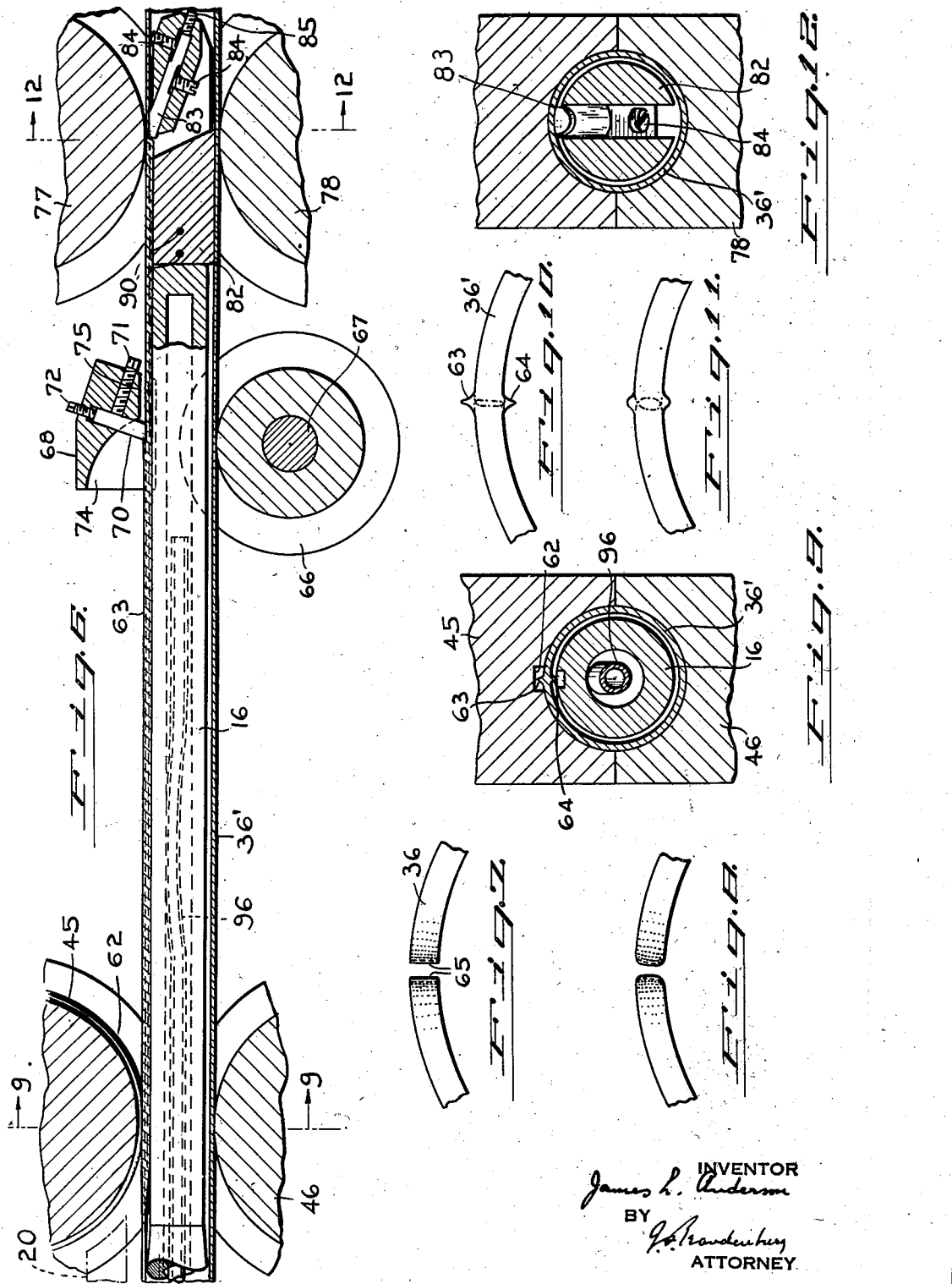

2,302,163

UNITED STATES PATENT OFFICE 2,302,163

MANUFACTURE OF WELDED TUBING

James L. Anderson, Closter, N. J., assignor to Air Reduction Company, Incorporated, New York, N. Y., a corporation of New York Application April 24, 1940, Serial No. 331,289
In Canada June 26, 1939

4 Claims. (Cl. 29—156)

This invention relates to the manufacture of high grade welded tubing. The process is used to make automobile drive shafts but is not limited to such use and can be advantageously employed for making various kinds of high grade tubing.

For welds of the highest strength it appears to be necessary in practice to have some actual fusion of the parts to be welded. With skelp material that has been manufactured with certain physical characteristics, such as a specified degree of hardness or ductility, a fusing and subsequent hardening of a portion of the metal often destroys those characteristics. A weld containing cast metal may not be as strong as the remainder of the metal of the tube, or it may be stronger and yet not have the desired physical characteristics. The grain structure of the cast metal is different from that of the skelp material. The flames burn out such elements as carbon and manganese from the metal on the edge surfaces and sometimes cause the surfaces of the edge faces to become oxidized.

It is an object of this invention to make high grade tubing having a weld of substantially the same strength as the body of the tube, and to make such a weld with essentially the same physical characteristics as the remainder of the tube.

These objects are attained by making a "fusion weld" that contains substantially no cast metal. The metal that is fused becomes cast metal when it hardens, but the invention squeezes out the molten metal and some plastic metal from between the edge faces and makes the weld between the sections behind the layers of melted surface metal. The extruded metal at the top and bottom of the weld is then cut off by tools as a continuous process with the welding.

With this invention, the fused metal that has been subjected to the direct flame or gas impingement is removed from the section between the edge portions, which sction is the metal of the weld between the circumferences of the inside and outside surfaces of the tube. By this definition, metal extruded beyond the level of the inner and outer walls is no longer between the edge portions; it is above or below the edge portions. The removal of the metal outside of these circumferential limits leaves the tubing with a uniform wall thickness that is important for drive shaft tubing which must have dynamic balance.

This application is a continuation in part of my copending application Serial No. 153,335, filed July 13, 1937, now Patent No. 2,203,319, dated June 4, 1940.

Other objects, features and advantages of this invention will appear or be pointed out as the specification proceeds.

In the accompanying drawings, forming part hereof:

Fig. 1 is a side elevation of apparatus for making welded tubing by the process of this invention.

Fig. 2 is an enlarged view, partly in section, of a portion of the apparatus ahead of the welding rolls of Fig. 1, with a tube blank passing through the apparatus.

Fig. 3 is an enlarged sectional view taken on the line 3—3 of Fig. 2.

Fig. 4 is an enlarged detail view taken on the line 4—4 of Fig. 2, and illustrating the heating of the edge faces.

Fig. 5 is an enlarged sectional view taken on the line 5—5 of Fig. 2, and illustrating the edge heating subsequent to that shown in Fig. 4.

Fig. 6 is an enlarged detail sectional view of a portion of the welding rolls and seam smoothing appartus shown in Fig. 1.

Figs. 7 and 8 are diagrammatic views illustrating different kinds of edge faces and the way in which they come together as they approach the welding rolls.

Fig. 9 is an enlarged sectional view, on the line 9—9 of Fig. 6, showing the displacement of metal from between the edge portions of the tube material in the welding roll pass.

Figs. 10 and 11 are diagrammatic views illustrating the displacement of the metal with the edge forms of Figs. 7 and 8, respectively.

Fig. 12 is an enlarged sectional view on the line 12—12 of Fig. 6.

The apparatus shown in Fig. 1 includes feed rolls 11, 12 supported in the frame of a roll stand 13 and driven by power mechanism, not illustrated but well understood in the art. Tube material comprising partially-formed or open-seam stock is supplied to the feed rolls 11, 12. This stock or tube blank may be either cold or preheated, and may come direct from a forming mill.

A mandrel 16 is connected to a fin 17 fastened to frame members 18 that are secured at their lower ends to the main frame 19 of the machine. The fin 17 not only serves as an anchorage for the mandrel but functions also as a seam guide for the tube blank.

Beyond the guide fin 17 there is a heating instrumentality, shown in the drawing as a torch 20, located along the run of the tube blank in position to heat the horizontal edge faces of the tube blank by projecting heating agencies, such as oxy-fuel gas flame jets 21, directly against the edge faces of the traveling tube blank in the manner shown in Figs. 3 and 4. The flame jets 21 issue from orifices indicated by the reference character 22. Other heating agencies can be used.

Oxygen and fuel gas are supplied to the torch 20 through a stock 24, and air is supplied to the torch through a stock 25. The torch is cooled by fluid passing through cooling chambers 26 (Fig. 3) in the torch block and flowing to and from the torch through tubes 27, 28. The torch 20 is supported from a frame 30 connected with the main frame 19 of the machine. A flange 32 along the bottom of the torch fits into a groove in the top of the mandrel 16.

Guide blocks 34 at the forward end and midportion of the torch 20 keep the seam edges from coming together as they pass under the torch. Grooved guide blocks 35 surround most of the circumference of the tube blank and guide products of combustion from the flame jets diagonally across the outside surface of the tube blank. Guiding or confining rolls may, of course, be used in place of the stationary guide surfaces. In the drawing the tube blank is indicated by the reference character 36 and the welded tube by the reference character 36'.

That portion of the mandrel 16 which is located under the torch 20 has grooves 37 through which the products of combustion that enter the tube blank flow diagonally forward around the inside surface of the tube blank and assist in heating the blank. The bottom of the mandrel 16 from the torch to the forward end of the mandrel is flat to leave a clearance between the mandrel and the tube blank for the escape of gases flowing down through the grooves 37.

The fuel gas used is preferably acetylene, and the products of the primary combustion of an oxyacetylene mixture are combustible. The torch 20 makes special provision for supplying air for the secondary combustion, the burning of the envelope gases of the flame jets. Air is supplied through the stock 25 to a chamber 40 in the torch block. Diverging jet passages 41 supply air above the flames for the combustion of that portion of the envelope gas which flows around the outside of the tube blank.

Passages 42 drilled upward through the flange 32 into the chamber 40 have cross-drillings 43 through which jets of air are supplied under the flames 21 for the combustion of the envelope gases which flow into the interior of the tube blank.

A short distance behind the torch 20, the tube blank enters the pass between welding rolls 45 and 46. These rolls turn on horizontal axles 47, 48 (Fig. 1) held in bearing blocks 49 and 50. The bearing blocks are vertically adjustable along guides 51 of a roll stand 53. Spacing of the bearing blocks 49 and 50, and of the axles 47, 48, is controlled by an adjusting screw 55 located between the bearing blocks. A pressure screw 56 threads through the top of the frame of the roll stand 53 and bears against the top of the upper bearing block 49. A lock-nut 57 holds the screw 56 in any set position. There are bearing blocks at both ends of the axles 47 and 48.

The rearward end of the torch 20 just ahead of the welding rolls does not extend downward into the seam. At this region where the seam edges are coming together, the face of the torch 20 is recessed and has orifices 60 (Fig. 5) on opposite sides of the recess and angularly disposed so that the flame jets from these orifices impinge upon one another and produce a fishtail flame 61 that is long and narrow and maintains the edge faces in their surface-fused condition during the brief interval that they are coming together to make the weld. A part of the torch 20 is broken away in Fig. 2 to show the location of some of the orifices 60.

The upper welding roll 45 straddles the seam, as shown in Fig. 9, and there is a groove 62 in the face of the roll over the seam. The welding rolls are of such size in proportion to the diameter of the tube and are so adjusted that they subject the seam to a pressure sufficient to squeeze the molten metal out from between the edges in the form of a flash or bead 63 on the outside of the tube and a similar flash or bead 64 on the inside. The apparatus can be constructed so as to obtain all of the bead on one side of the tube.

The circumference of the substantially circular pass between the welding rolls is less than the width of the skelp from which the tube blank is made, and the action of the welding rolls is to cause the portions of the tube on either side of the seam to move circularly across the surfaces of the rolls toward the seam, so that the edge portions of the tube are displaced toward one another.

The tube blank travels past the torch 20 at high speed. In practice speeds of the order of 150 ft. per minute are used, but this figure is given as an illustration and not as a limitation on the invention because the speed depends to a great extent upon the length of the torch used and upon the amount of preheating, if any.

It is a feature of the invention, however, that the heating is done quickly and evenly across the full width of the edge faces by projecting heating jets directly against the edge faces. It is necessary that the edge faces be sufficiently separated during the heating step to permit the heat to be applied directly to and uniformly across the edge faces.

Fig. 4 shows the flame jets 21 projected against the middle portion of each edge face. This direct heating produces a very steep temperature gradient behind the edge faces. With flame jets closely spaced along the length of the torch, the surface of each edge face can be fused before the metal a short distance behind the edge faces has been heated above the critical point. When the edge faces reach a state of surface fusion, there is a layer of plastic metal immediately behind the fused surface layer. The plasticity decreases rapidly away from the face, the thickness of the plastic layer depending upon the intensity of the heating and the corresponding time interval required to effect the surface fusion.

The surface layer of fused metal 65 is indicated in the drawing by short solid lines such as are conventionally used to denote liquids, and the plastic layer behind the fused layer is indicated by stippling, with the degree of plasticity shown by the intensity of the stippling. The thickness of both the surface layer of liquid and the underlying plastic layer are exaggerated in the drawing.

The direct edge heating must be discontinued in order to let the edges come together ahead of the welding rolls. In order to prevent the faces from cooling below a fusing temperature during the short interval while they are coming together, the fishtail flames of Fig. 5 are used.

When the edge faces approach each other in substantially parallel relation, as shown in Figs. 5 and 7, the fused metal can be displaced outward and inward, as shown in Figs. 9 and 10, and the weld is made between the plastic metal behind the fused surface layers. There is no thickness requirement for the layers of plastic metal when the seam edges come together in substantially parallel relation. In practice there is always some plastic metal behind that which is fused no matter how steep the temperature gradient.

With the edge faces in the parallel relation shown in Fig. 7, it is sufficient for the circumference of the welding roll pass, shown in Fig. 9, to be less than the width of the tube material by an amount equal to the sum of the thicknesses of the fused layers of metal on the confronting edge faces. This sum is the distance between the dot and dash lines in Fig. 10. These lines represent the positions that the original edge faces would have occupied if no metal had been displaced.

When the edge faces have rounded corners, as shown in Fig. 8, it is necessary to have a greater thickness of plastic metal behind each face because the edges must be deformed sufficiently when pressed together to fill with plastic metal the pockets formed by the rounded corners. With the rounded edge corners the molten metal is forced out from between the flats first and it is the subsequent yielding of the underlying plastic metal that permits the edge portions to be moved close enough to force molten metal from between the rounded corners.

In Fig. 11 the dot and dash lines show the positions that the original edge faces would occupy if no metal, either liquid or plastic, of the edge portions were displaced. In order to displace metal from between the upper part of the seam considerable displacement of plastic metal between the rounded corners is necessary. Some of the plastic metal is displaced downward and some upward, and it is this upward and downward flow of plastic metal that forces out the molten metal between the rounded corners.

When making welded tubing with rounded edge faces that meet as shown in Fig. 8, it is necessary that the circumference of the welding roll pass be less than the width of the tube material by an amount equal to the sum of the thicknesses of the fused layers plus an increment that depends upon the size of the pockets that exist between the rounded corners when the edge faces of the seam first come into contact.

Beyond the welding roll stand the tube passes across a supporting roll 66 which turns on an axle 67 and has a concave face that fits the curvature of the tube. A shoe 68 holds the tube 36' down against the supporting roll 66. A cutting tool 70 fits into a socket in the shoe 68 and is clamped against movement by a set-screw 71 threaded through the shoe 68. Vertical positioning of the cutting tool 70 is effected by means of a screw 72 threading through a wall of the shoe 68 at the upper end of the tool socket. The cutting tool 70 is located immediately above the supporting roll 66. The distance between the welding roll stand and the cutting tool 70 is sufficient to permit the metal at the weld to cool to a temperature suitable for cutting.

The tool 70 is ground to the shape of the tube 36' so that the bead 63 is removed without leaving any flat spot or break in the cylindrical surface of the tube. A recess 74 in front of the cutting tool 70 provides ample clearance for chips thrown up by the cutting action of the tool. There is a groove 75 in the shoe behind the tool 70 for the escape of chips on the surface of the tube and traveling with the tube.

Beyond the supporting roll 66 and the tool 70, the tube travels between two rolls 77 and 78 on horizontal axles supported at their opposite ends by bearing blocks in a roll stand 80 similar in construction to the axles and bearings of the welding roll stand 53. Within the tube where it passes between the rolls 77 and 78 is a tool-molder 82 connected with the end of the mandrel 16. A tool 83 is held in a socket in the tool-holder by set-screws 84, and the position of the tool with respect to the tube wall can be accurately adjusted by means of an adjusting screw 85 threaded through a wall of the tool-holder 82 at the end of the tool-receiving recess. The lower part of the tool-holder is cut away for the escape of chips. The roll 77 is directly over the tool 83 to prevent displacement of the tube wall by the pressure of the cutting tool.

The mandrel 16 is hollow and closed at both ends by heads welded to the main portion at its forward and rearward ends. The tool-holder 82 is connected to the mandrel 16 by a tongue which fits into a groove in the head at the rearward end of the mandrel and is fastened to the head by rivets 90 (Fig. 6).

The mandrel 16 is water-cooled. There are inlet and outlet connections 91 and 92 (Fig. 2) respectively extending through the wall of the mandrel at points near the middle of the guide fin 17, as shown in Fig. 2. There is a partition 94 across the inside of the mandrel between the cooling water connections 91 and 92. A pipe 96 having an outside diameter substantially less than the inside diameter of the mandrel extends through the partition 94 and along the inside of the mandrel to a point well beyond the welding rolls and preferably almost to the bead-removing tools.

Water or other cooling fluid flows into the mandrel through the inlet connection 91, then toward the rearward end of the mandrel through the pipe 96, and then back through the space between the pipe 96 and the wall of the mandrel to the outlet connection 92.

Terms of orientation used in the description and claims are, of course, relative, and it will be apparent that the invention can be performed with apparatus other than that shown in the drawings. Some features of the invention can be used without others.

I claim:

1. The method of making a high-grade welded tube of uniform wall thickness and homogeneous section, which method comprises heating the edge faces of a longitudinal seam of a moving tube blank progressively along the length of the seam and with the edge faces separated and the heating produced by projecting heating jets directly against the edge faces to heat the edge faces quickly across their full width, progressively bringing the edge faces together immediately after the heating step, welding the seam by pressing the edge portions of the tube together with enough pressure to squeeze out from between said edge portions any consequential amount of metal that was fused by the heating step, and as the welded tube moves beyond the region of welding, reducing the wall thickness at the weld to the same thickness as the body of the tube by cutting means which mechanically remove the squeezed-out metal from the weld.

2. The method of welding and smoothing tube seams in the producing of high grade tubes having dynamic balance and suitable for automobile drive shafts, which method comprises progressively heating skelp, which is of the desired physical characteristics and of tubular section with separated edge faces, by projecting oxyacetylene flame jets into direct impingement against the surfaces of the edge faces to heat said edge faces substantially uniformly across their full widths, concluding the heating as the edges come together with flame jets directed into the seam cleft, fusing the edge surfaces by the heating step, supplying air into the regions of the flame jets to promote combustion of the envelope gases in the vicinity of the edge faces, confining and guiding the products of combustion across both the inside and outside surfaces of the tubular section, progressively bringing the edge faces together immediately beyond the region of heating, welding the seam by pressing the edge portions together with enough pressure to squeeze out from between the edge portions substantially all of the metal that was fused by the heating flames, causing the welded tube to continue to move beyond the region of welding until the metal of the weld cools enough to be cut, and as the metal cools to such cutting temperature progressively cutting off the metal that was squeezed from the weld both inside and outside of the tube to make the seam thickness the same as the thickness of the remainder of the tube.

3. The method of making a homogeneous welded connection of a thickness equal to that of two metal sections that are joined by the weld, which method comprises heating the edge faces of the metal sections progressively along the length of the edge faces to produce at least a surface fusion of the confronting edge faces, performing said heating by projecting heating jets directly against said faces, bringing the heated edge faces together progressively with a force that extrudes all consequential amounts of the fused metal from between the metal sections to produce a weld that is homogeneous with the sections by a uniting of the plastic surfaces that lie behind the fused surfaces and that have been unaffected by direct impingement of the heating jets, and mechanically removing the extruded metal from the seam as a progressive operation performed simultaneously with and a short distance behind the bringing of the edge faces together under pressure.

4. The method of welding tubes at high speed and with welds free of consequential inclusions of fused metal, which method comprises heating the edge faces of a partially-formed skelp by projecting heating jets into impingement with the edge faces while said faces are separated to heat the edges quickly with a steep temperature gradient, continuing the heating as the edge faces are brought together, pressing the edge portions of the skelp into contact to make a weld immediately after the edge faces are heated to fusion by the heating step, causing the edge faces to meet as substantially parallel planes, and forcing the edge portions of the tube together with sufficient pressure to squeeze out all consequential amounts of the fused metal from between the edge portions of the tube.

JAMES L. ANDERSON.